（12）United States Patent
Lovett et al.

(10) Patent No.: US 8,336,280 B2
(45) Date of Patent: Dec. 25, 2012

(54) PIVOTING CENTER CONVEYOR FOR DRAPER PLATFORM

(75) Inventors: Benjamin M. Lovett, Colona, IL (US); Benjamin J. Schlesser, Bettendorf, IA (US); Bruce A. Coers, Hillsdale, IL (US); Austin William Hughes, Kaysville, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/112,223

(22) Filed: May 20, 2011

(65) Prior Publication Data

US 2012/0291412 A1    Nov. 22, 2012

(51) Int. Cl.
*A01D 67/00* (2006.01)

(52) U.S. Cl. ............................................ 56/208; 56/181

(58) Field of Classification Search .................. 56/208, 56/181, 212–217, 10.4, 15.8, 15.9
See application file for complete search history.

(56) References Cited

U.S. PATENT DOCUMENTS

| 4,573,308 | A  | * | 3/1986  | Ehrecke et al. | 56/14.4 |
| 6,202,397 | B1 | * | 3/2001  | Watts et al.   | 56/208 |
| 6,675,568 | B2 | * | 1/2004  | Patterson et al. | 56/208 |
| 7,412,816 | B2 | * | 8/2008  | Coers et al.   | 56/208 |
| 7,430,846 | B2 | * | 10/2008 | Bomleny et al. | 56/10.2 E |
| 7,877,976 | B2 | * | 2/2011  | Honas et al.   | 56/208 |
| 8,061,115 | B2 | * | 11/2011 | Honas et al.   | 56/181 |
| 2010/0043372 | A1 | * | 2/2010 | Honas et al.   | 56/181 |

* cited by examiner

*Primary Examiner* — Arpad Fabian-Kovacs

(57) ABSTRACT

A draper platform (100) has a center endless belt conveyor (118) that is supported on and between two adjacent support arms (246A, 246B) that pivot with respect to each other and with respect to the frame (102, 104, 106) of the draper platform (100) to which the two adjacent support arms (246A, 246B) are pivotally connected.

7 Claims, 4 Drawing Sheets

US 8,336,280 B2

PIVOTING CENTER CONVEYOR FOR DRAPER PLATFORM

FIELD OF THE INVENTION

The present invention relates to agricultural combine harvesting machinery, and more particularly to draper platforms. Even more particularly it refers to center conveyors for such draper platforms.

BACKGROUND OF THE INVENTION

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements are added such as row units, reciprocating knife assemblies, augers, reels, and endless belt conveyors. One such type of harvesting head is called a "draper platform" or "draper".

Draper platforms have an elongate frame on which are mounted left and right side endless belt conveyors mounted immediately behind a reciprocating knife. These endless conveyors convey cut crop material inward to a center portion of the draper platform, depositing them on a center conveyor that moves rearward. The center conveyor carries the material to and through an aperture at the rear of the draper platform frame, where it is deposited in an elevating conveyor called a feederhouse, which carries the cut crop material into the combine vehicle for threshing, separating and cleaning.

In one arrangement, the reciprocating knife is mounted on pivoting support arms that extend forward from a rear transverse frame member. See US 2009/0249760 A1, FIGS. 1-11, in which the conveyors are stationary and the reciprocating knife moves up and down on parallelogram arms. This arrangement permits the entire cutter bar to flex up and down, severing the crop plants close to the ground.

In another arrangement, the left and right side conveyors have also been mounted on pivoting support arms. These support arms are generally horizontal and are pivotally connected to an elongate laterally extending frame member at their rear ends, and are connected to and support a reciprocating knife at their front ends. The pivoting arms permit both the conveyor belts and the reciprocating knife to move up and down to follow the terrain.

For example, in US 2009/0249760 A1 a second embodiment is illustrated in FIGS. 12-22 in which the rear center conveyor roller is fixed with respect to the rear beam and supports two side plates that support the forward roller and are connected by a pan extending underneath the endless belt that is connected to skids via a sliding connection. The side conveyor belts are supported on arms disposed above the center conveyor that pivot up and down.

US 2009/0084080 discloses another arrangement in which the side conveyors are supported on pivoting arms. No center conveyor is disclosed, however.

US 2010/0011729 illustrates a center conveyor supported on a frame that also supports a feeder drum. Side plates support the front and rear rollers of the center conveyor and the forward end of the conveyor is received and supported in V-shaped guides that extend rearward from the reciprocating knife assembly of the draper platform. The system is arranged to permit the feeder drum and center conveyor to be slidably inserted into and removed from the draper platform from the rear of the platform.

The problem to be solved is that of supporting the center conveyor between two floating arms to permit the arms supporting the reciprocating knife and disposed on each side of the center conveyor to pivot up and down, thereby permitting the reciprocating knife to follow the contours of the ground more accurately.

This problem is solved by the arrangement described in claim 1. Further advantages are provided by additional claims that are dependent upon claim 1.

SUMMARY OF THE INVENTION

In accordance with a first embodiment of the invention, a draper platform for mounting on the feederhouse of an agricultural combine, is provided that includes a frame, wherein said frame is elongate and extends generally perpendicularly to the direction of operational travel of the draper platform and extends generally parallel to the ground; a plurality of forwardly extending support arms having a pivotal connector located at the rear of the support arms by which they are pivotally connected to the frame, wherein the support arms extend forwardly and slightly downwardly to their forward ends, said plurality of support arms being constrained to pivot generally up and down at their forward ends about their pivotal connectors to the frame and with respect to the frame; an elongate reciprocating knife that extends laterally across substantially the entire transverse extent of the draper platform, wherein said reciprocating knife is disposed at a forward edge of the draper platform, wherein said reciprocating knife is connected to the forward ends of the plurality of support arms, wherein the reciprocating knife is configured to flex and thereby permit each support arm to independently pivot up and down with the forward ends of the support arms; a first side conveyor, said first side conveyor being disposed behind the reciprocating knife on the left side of the draper platform to convey cut crop material severed by the reciprocating knife at the left side of the draper platform laterally inwardly toward the middle of the draper platform; a second side conveyor, said second side conveyor being disposed behind the reciprocating knife on the right side of the draper platform to convey cut crop material severed by the reciprocating knife at the right side of the draper platform laterally inwardly toward the middle of the draper platform, and a center endless belt conveyor, wherein said center conveyor is disposed to receive cut crop material from the first and second side conveyors and to carry the cut crop material rearward, wherein said center conveyor is coupled to two adjacent arms of said plurality of support arms to permit each of the two adjacent arms to pivot up and down both with respect to the other of said two adjacent arms and with respect to the frame.

The draper platform may further comprise a plurality of mounting brackets, wherein the plurality of mounting brackets are mounted to the two adjacent support arms and to the center conveyor. Each of the plurality of mounting brackets may further comprise a first coupler fixed to one of the two adjacent arms and a second coupler fixed to a side plate. The draper platform may further comprise an elastomeric bushing, disposed between the first coupler and the second coupler. The draper platform may further comprise first and second drive motors, wherein said first and second drive motors are supported on a first of said two adjacent arms and a second of said two adjacent arms, respectively, wherein said central conveyor is supported on drive shafts extending from said first and second drive motors. The center conveyor may further comprise a drive roller disposed to drive the center conveyor, and further wherein the drive roller may be supported on and driven by the drive shafts of the two drive motors. The center conveyor may further comprise first and second side plates that support front and rear rollers in spaced-apart relation, and may comprise an endless conveyor belt supported for rotation about the front and rear rollers. The center conveyor may be supported on elastomeric bushings that couple the first and second side plates to inwardly-facing surfaces of the two adjacent support arms.

DETAILED DESCRIPTION OF THE PREFERRED EMBODIMENT

The terms "front", "in front of", "forward", "fore-and-aft", "rear", "behind", "rearward", and the like as used herein are made in reference to "V" (FIG. 1), which is the direction of travel through the field during normal, straight-line, harvesting operations. The direction of travel is horizontal and perpendicular to the longitudinal extent of the draper platform. The terms "transverse", "side-to-side", and the like refer to a direction generally parallel to the longitudinal extent of the draper. This direction is horizontal and transverse to the direction of travel "V" of the draper platform.

Below, the application describes the construction and operation of structures on the left side of the draper platform. The construction and operation of the right side of the draper platform is identical to the construction and operation of the left side of the draper platform in every respect, but is constructed as a mirror image of the left side.

Figure 1:
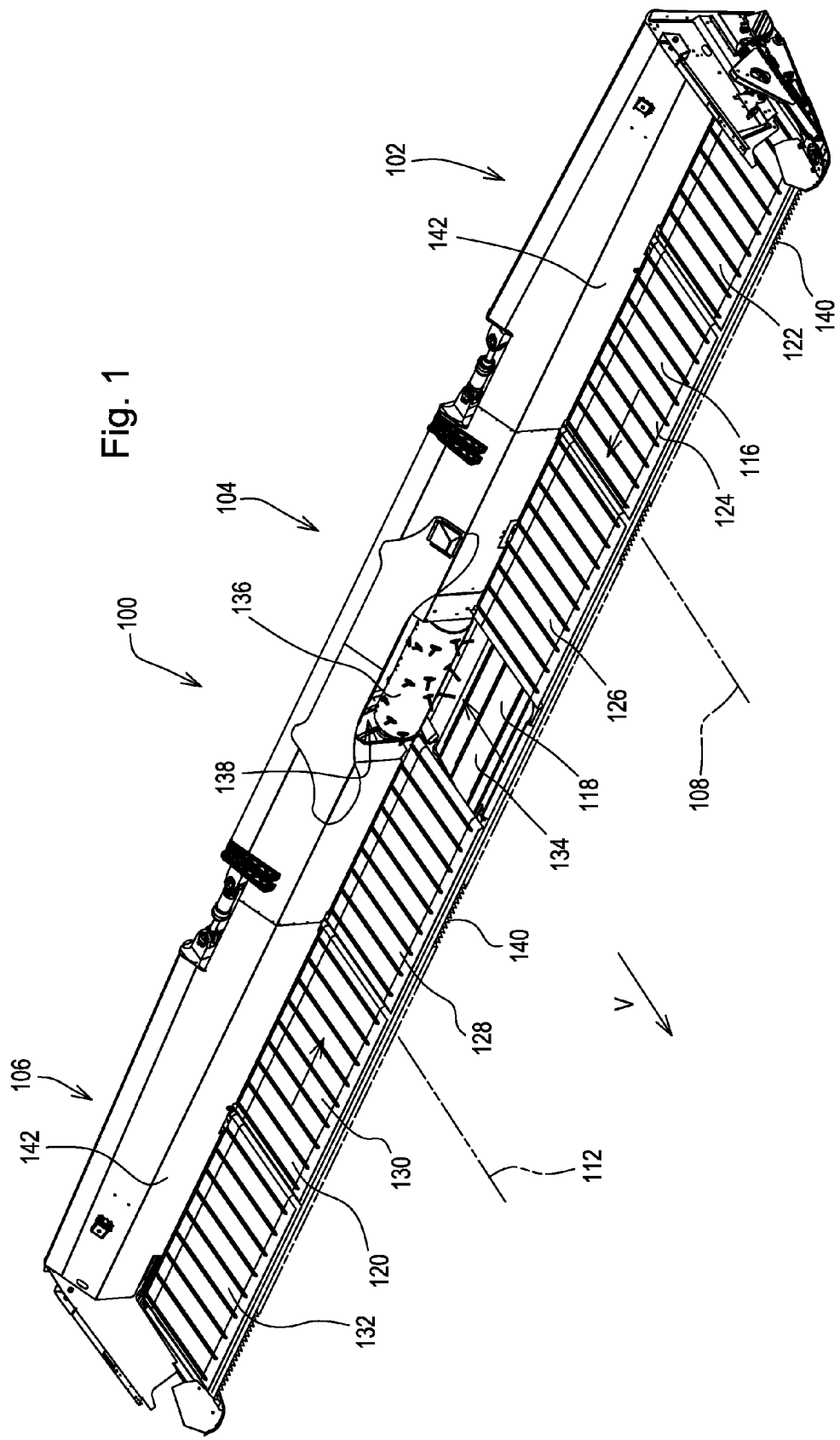
FIG. 1 is a perspective view of a draper platform in accordance with the present invention.
Figure 2:
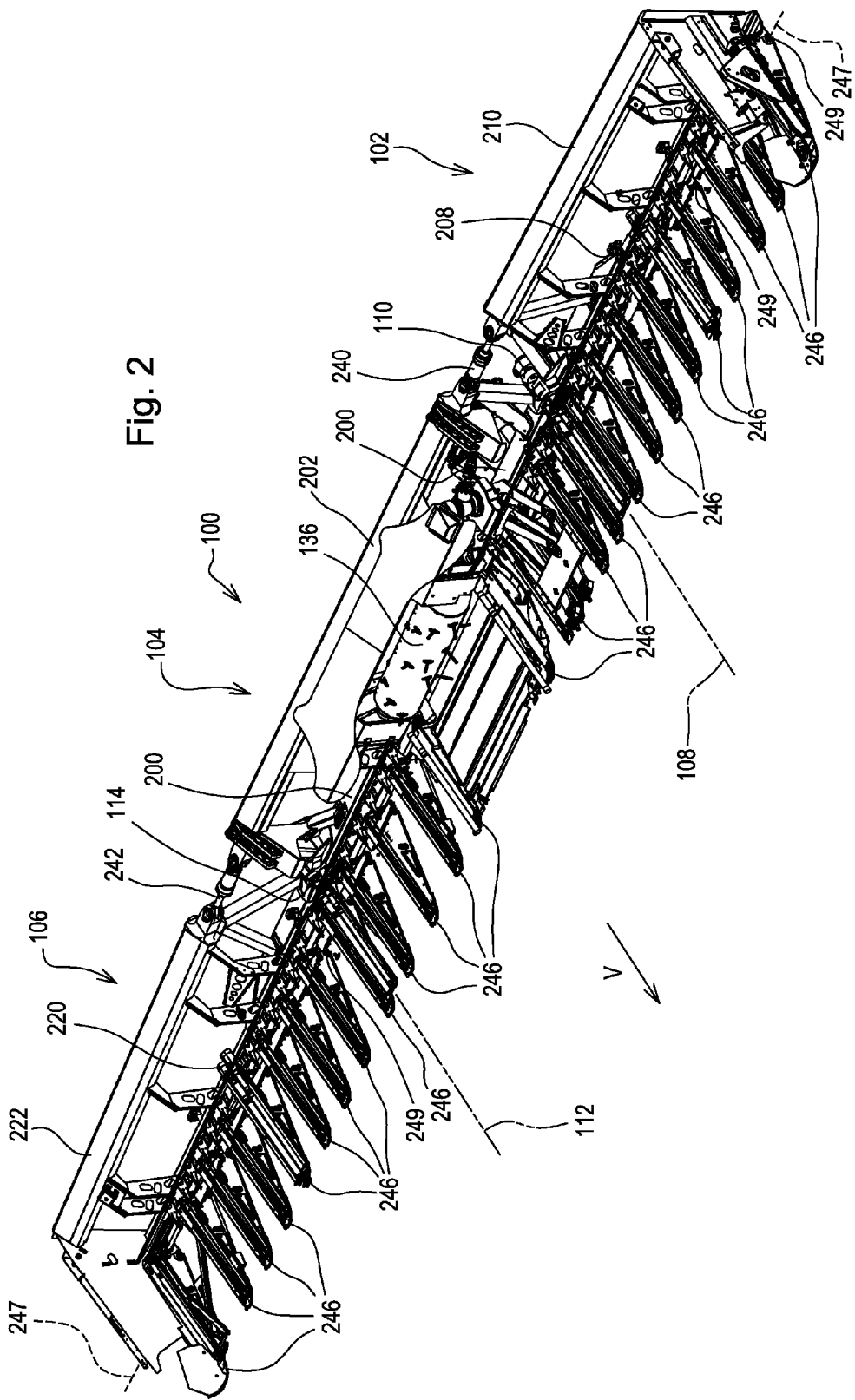
FIG. 2 is a perspective view of the draper platform of FIG. 1 with the conveyor belts and back sheets removed.

In FIGS. 1 and 2, a draper platform 100 is comprised of an elongate and laterally extending frame comprising left frame section 102, a center frame section 104, and a right frame section 106. These three frame members are coupled to one another and extend linearly, laterally and horizontally in an end-to-end relationship. Left frame section 102 pivots about a generally horizontal and forwardly extending axis 108 with respect to center frame section 104. This axis is defined by pivot joint 110. Pivot joint 110 couples left frame section 102 and center frame section 104 together and constrains them to pivot about axis 108. Right frame section 106 pivots about a generally horizontal and forwardly extending axis 112 with respect to center frame section 104. This axis is defined by pivot joint 114. Pivot joint 114 couples right frame section 106 and center frame section 104 together and constrains them to pivot with respect to each other about axis 112.

Draper platform 100 further comprises a left side endless belt conveyor 116, a center endless belt conveyor 118, and a right side endless belt conveyor 120. Left side endless belt conveyor 116 is comprised of 3 separate endless conveyor belts 122, 124, 126. Right side endless belt conveyor 120 is comprised of 3 separate endless conveyor belts 128, 130, 132. Endless conveyor belts 122, 124, 126, 128, 130, 132 have upper surfaces that are coplanar and are driven by motors (not shown) to carry cut crop material laterally inwardly in the direction (indicated by the arrows that are superimposed on the conveyors) toward the center portion of draper platform 100, where they deposit their cut crop material onto endless conveyor belt 134 of center endless belt conveyor 118. Endless conveyor belt 134 is driven by a motor (not shown) to carry cut crop material rearwardly in the direction indicated by the arrow superimposed on endless conveyor belt 134. Endless conveyor belt 134 carries the cut crop material rearward and underneath guide roller 136. Guide roller 136, in turn, carries the cut crop material rearward from the upwardly facing top surface of the center conveyor belt, through central aperture 138 disposed at the rear wall of draper platform 100. Cut crop material passing through central aperture 138 is received in a feederhouse (not shown) of an agricultural combine (also not shown) in the conventional manner.

An elongate reciprocating knife assembly 140 is disposed along the leading edge of the draper platform 100, extending substantially the entire width of the draper platform. The elongate reciprocating knife assembly 140 is configured to sever crop plant stems near the ground, permitting the upper portion of the crop plant to fall on the left side endless belt conveyor 116, center endless belt conveyor 118 and right side endless belt conveyor 120. A reel (not shown) is disposed above the elongate reciprocating knife assembly 140 and is configured to engage the tops of the crop plants, gently pushing them rearward such that they fall onto endless belt conveyors 116, 118, 120. The conveyors and the elongate reciprocating knife assembly are connected to and supported on support arms 246 (FIG. 2).

Back sheets 142 extend generally vertically from the rear edge of endless conveyor belts 122, 124, 126, 128, 130, 132. These back sheets serve as a backstop or barrier to prevent cut crop material from passing completely across draper platform 100 and falling on the ground. Back sheets 142 terminate at the aperture and define the opposing sides of central aperture 138.

As the draper platform travels over the ground, the ground presses upward on skid shoes mounted on the bottom of the reciprocating knife assembly causing the elongate reciprocating knife assembly to move up and down and flex independently along its length as the skids shoes drag along the ground following the undulating ground terrain. The elongate reciprocating knife assembly is mounted at the leading edge of the draper platform on support arms 246 (FIG. 2). The support arms 246, in turn, flex up and down to accommodate the movement of the reciprocating knife.

In FIG. 2, back sheets 142 have been removed for ease of illustration, as have endless conveyor belts 122, 124, 126, 128, 130, and 132, and elongate reciprocating knife assembly 140.

Center frame section 104 comprises a horizontal and laterally extending beam 200 that is coupled to a horizontally and laterally extending beam 202. Beam 202 is parallel to and disposed above beam 200. Cross members couple beams 200, 202 together to provide a rectangular framework.

In a similar fashion, left frame section 102 is comprised of a horizontally and laterally extending beam 208 that is coupled to a horizontally and laterally extending beam 210. Beam 210 is parallel to and disposed above beam 208. Cross members extend between and couple beams 208, 210 together to form left frame section 102.

In a similar fashion, the frame of right frame section 106 is comprised of a horizontally and laterally extending beam 220 that is coupled to a horizontally and laterally extending beam 222. Beam 222 is parallel to and disposed above beam 220. Cross members extend between and couple beams 222, 220 together to form right frame section 106.

The left end of beam 200 and the right end of beam 208 are coupled together by a pivot joint 110. Pivot joint 110 couples together lower adjacent portions of left frame section 102 and center frame section 104.

The right end of beam 200 and the left end of beam 220 are coupled together by a pivot joint 114. Pivot joint 114 couples together lower adjacent portions of right frame section 106 and center frame section 104.

The left end of beam 202 and the right end of beam 210 are coupled together by an elongate member 240. Elongate member 240 couples together upper adjacent portions of left frame section 102 and center frame section 104.

The right end of beam 202 and the left end of beam 222 are coupled together by an elongate member 242. Elongate member 242 couples together upper adjacent portions of right frame section 106 and center frame section 104

A plurality (e.g. 26) of conveyor support arms 246 are pivotally coupled to beams 200, 208, and 220 at the rear ends of arms 246 such that they can pivot up and down at the forward ends of arms 246 as the draper platform 100 travels through the agricultural field harvesting crops. Beams 200, 208, 220 extend substantially horizontally and transversely. Conveyor support arms 246 are fixed to the elongate reciprocating knife assembly 140 (FIG. 1) at their forward ends. Elongate reciprocating knife assembly 140 is designed flexible enough that individual support arms 246 can move up and down with respect to adjacent support arms 246 as they follow the terrain of the agricultural field, and the elongate reciprocating knife assembly 140 can flex between these adjacent arms to permit this relative movement.

Support arms 246 are all disposed generally horizontally and extend forward and slightly downward from the rear pivot of each support arm 246. The support arms 246 are spaced parallel to each other. Each support arm 246 is preferably spaced equidistant from its immediately adjacent support arm or arms 246.

Figure 3:
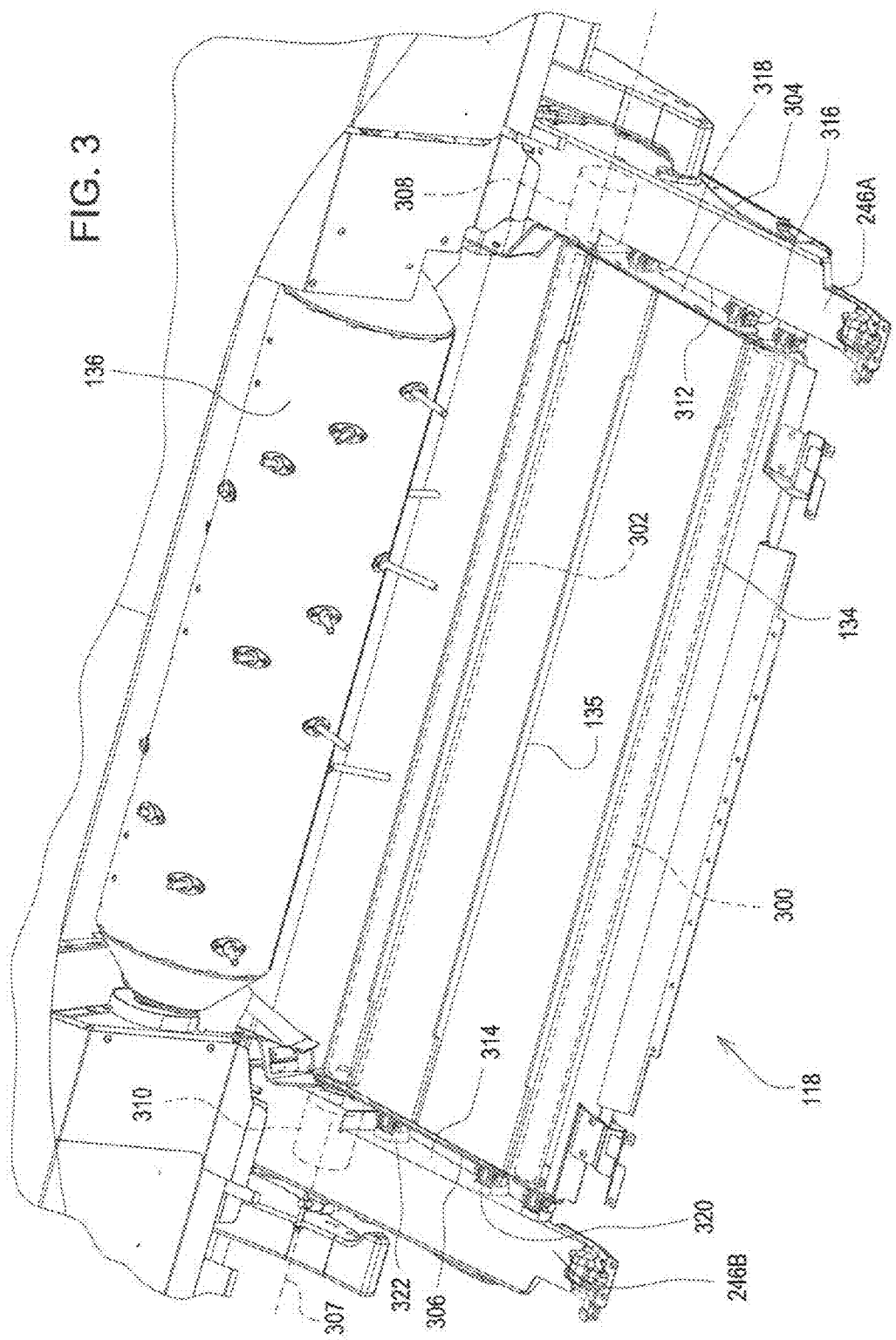
FIG. 3 is a fragmentary detail perspective view of the center region of the draper platform of FIGS. 1-2.

Referring now to FIG. 3, additional details of the center endless belt conveyor 118 can be seen. Center endless belt conveyor 118 has a front roller 300, a rear roller 302, and an endless conveyor belt 134 mounted to endlessly revolve around the two rollers.

The rollers are horizontal and extend transversely. The endless conveyor belt 134 is made of a thin woven fabric impregnated and covered with an elastomeric material. Elongated elastomeric cleats 135 are formed in its upper surface to engage the crop material and help convey it to the guide roller 136.

The center conveyor comprises two side plates including a left side plate 304 and a right side plate 306 that define the left and right edges of the center endless belt conveyor 118. The side plates are generally planar and extend vertically and longitudinally, generally parallel to the direction of travel "V" of the draper platform.

The two side plates are coupled to a support frame disposed inside the loop formed by the endless belt conveyor and between the two side plates. This support frame holds the two side plates in parallel to each other a fixed distance apart in the fixed relative positions illustrated herein. The support frame also supports and spring-loads the front roller 300 with respect to rear roller 302 to maintain the endless conveyor belt 134 in tension for rotation about both rollers.

The rear roller 302 is supported for rotation on bearings fixed to the rear ends of the left and right side plates. The rear roller rotates such that its axis of rotation 307 passes through two apertures in the rear of the left and right side plates 304, 306.

Two rotary drive motors 308, 310 are mounted inside and mounted to the support arms 246A and 246B (shown in FIG. 3) that flank the center endless belt conveyor 118. The drive motors have rotating drive shafts that pass through apertures in the inner facing sidewalls 314, 312 of support arms 246A, 246B, respectively, and into the apertures in the rear of the side plates. These drive shafts are slidably received in opposing ends of the rear roller 302 to drive the rear roller 302 in rotation and thereby drive the endless conveyor belt 134.

Mounting brackets 316, 318, 320, 322 couple the center endless belt conveyor 118 to and between the support arms 246A and 246B. Bracket 316 couples the forward end of the left side plate 304 to support arm 246A. Bracket 318 couples the rear end of the left side plate 304 to support arm 246A. Bracket 320 couples the forward end of the right side plate 306 to support arm 246B. Bracket 322 couples the rear end of the right side plate 306 to support arm 246B. Thus the center endless belt conveyor 118 is supported on the four brackets and on the two motors.

The brackets 316, 318, 320 and 322 are constructed the same. For that reason we will only discuss the construction of bracket 320 which connects the right forward side of center endless belt conveyor 118 to support arm 246B (in FIG. 3).

Figure 4:
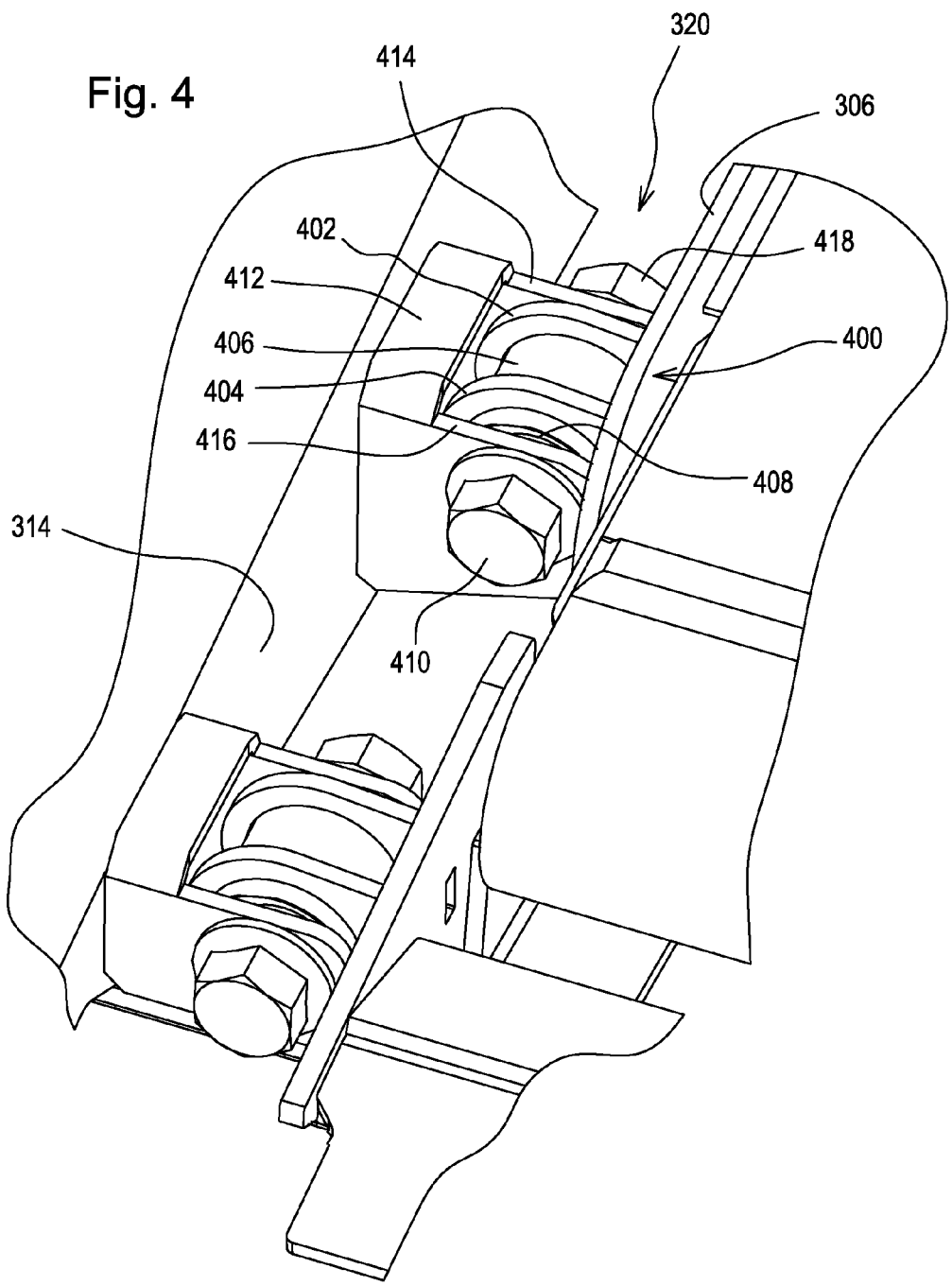
FIG. 4 is a fragmentary detail perspective view of the flexible couplers that mount the center conveyor to the support arms that support the reciprocating knife.

Referring to FIG. 4, bracket 320 comprises a first coupler 400 that is fixed to the outer surface of side plate 306. Coupler 400 extends to the right, away from side plate 306. Coupler 400 comprises two metal ears 402, 404, that extend generally vertically and laterally. A cylinder 406 that is hollow and right-circular extends between and is supported within ears 402, 404 in corresponding apertures formed in ears 402,404. Cylinder 406 is not fixed to ears 402, 404, but is free to slide slightly back and forth in the circular apertures formed in ears 402, 404.

An elastomeric bushing 408 that is right-circular and cylindrical is disposed inside and supported within cylinder 406. Elastomeric bushing 408 fits snugly within cylinder 406. It has a hole that is coaxial with its outer cylindrical surface that is sized to receive the shank of a bolt 410. This arrangement permits the bolt to translate in three orthogonal directions with respect to cylinder 406 and to rotate with respect to cylinder 406 about three orthogonal axes.

Bracket 320 also comprises a second coupler 412 that is fixed to the inner facing sidewall 314 of support arm 246B. Coupler 412 extends inwardly and to the left, away from the surface of inner facing sidewall 314 and toward side plate 306. Coupler 412 comprises two ears 414,416 that extend generally vertically and laterally and parallel to ears 402,404 of first coupler 400. Ears 414, 416 are spaced apart such that they receive ears 402, 404 therebetween. Apertures are provided in ears 414, 416 that are coaxial with the apertures in ears 402, 404. Apertures in ears 414, 416 have a smaller diameter just sufficient to receive the shank of bolt 410 with a running clearance and permit the shank to pass therethrough.

When the bracket 320 is assembled, the shank of bolt 410 passes entirely through the four ears and through the aperture in the elastomeric bushing 408 leaving enough of the shank extending out the far side (i.e. the side away from the head of bolt 410) to permit a locknut 418 to be secured thereto and thereby to prevent bolt 410 from falling out of the ears of bracket 320.

The elastomeric bushing 408 is the element that provides the resilience and flexibility to bracket 320. It is sized to permit support arm 246B to pivot up and down with respect to support arm 246A during normal operation. The reciprocating knife is connected to the forward ends of support arms 246A and 246B. The skid shoes fixed to the bottom of the reciprocating knife raise and lower the elongate reciprocating knife assembly as they follow the undulating terrain. This movement causes the support arms 246A and 246B to pivot up and down with respect to beam 200, the bracket 320 (together with identical brackets 316, 318, and 322) provide enough flexibility that the center endless belt conveyor 118 can be fixed to the support arms 246A and 246B and permit them to pivot up and down with respect to each other without the center endless belt conveyor 118 being damaged. Thus the brackets 316, 318, 320 and 322, cylinders 406, elastomeric bushings 408, bolts 410 and locknuts 418 define a connection arrangement constructed so as to permit each of the two adjacent support arms (246A, 246B) to pivot up and down with respect to the other of said two adjacent support arms (246A, 246B), with respect to the center endless belt conveyor (118) and with respect to the frame (102, 104, 106).

Furthermore, by connecting the support arms and the center conveyor using bolts 410 that are oriented in a fore-and-aft direction and are disposed in the gap between left and right side plates 304, 306 and inner facing sidewalls 312, 314, of the support arms, it is convenient to insert wrenches into the gap and to extract the bolts. This is done by removing the lock nuts and sliding the bolts forward in a direction generally parallel to the longitudinal gap between the center conveyor and the flanking support arms.

What is claimed is:

1. A draper platform for mounting on a feederhouse of an agricultural combine, comprising:
   a frame (102, 104, 106), wherein said frame (102, 104, 106) is elongate and extends generally perpendicularly to the direction of operational travel of the draper platform and extends generally parallel to the ground;
   a plurality of support arms (246) that extend forwardly and have a pivotal connector located at the rear of the plurality of support arms by which they are pivotally connected to the frame (102, 104, 106), wherein the plurality of support arms extend forwardly and slightly downwardly to their forward ends, said plurality of support arms being constrained to pivot generally up and down at their forward ends about their pivotal connections to the frame (102, 104, 106) and with respect to the frame (102, 104, 106);
   a reciprocating knife assembly (140) that is elongate and extends laterally across substantially an entire transverse extent of the draper platform (100), wherein said reciprocating knife assembly is disposed at a forward edge of the draper platform, wherein said reciprocating knife assembly is connected to the forward ends of the plurality of support arms (246), wherein the reciprocating knife assembly is configured to flex and thereby permit each support arm of the plurality of support arms to independently pivot up and down with the forward ends of adjacent ones of the plurality of support arms;
   a first side conveyor (116), said first side conveyor being disposed behind the reciprocating knife assembly on the left side of the draper platform to convey cut crop material severed by the reciprocating knife assembly at the left side of the draper platform laterally inwardly toward the middle of the draper platform;
   a second side conveyor (120), said second side conveyor being disposed behind the reciprocating knife assembly on the right side of the draper platform to convey cut crop material severed by the reciprocating knife assembly at the right side of the draper platform laterally inwardly toward the middle of the draper platform (100), and
   a center endless belt conveyor (118), wherein said center endless belt conveyor (118) is disposed to receive cut crop material from the first side conveyor (116) and the second side conveyor (120) and to carry the cut crop material rearward, wherein said center endless belt conveyor (118) includes opposite side plates (304 and 306) and is located between and connected to two adjacent support arms (246A, 246B) of said plurality of support arms by a connection arrangement (316, 318, 320, 322, 406, 408, 410, 418) constructed so as to permit each of the two adjacent support arms (246A, 246B) to pivot up and down with respect to the other of said two adjacent support arms (246A, 246B), with respect to the center endless belt conveyor (118) and with respect to the frame (102, 104, 106).

2. The draper platform of claim 1, wherein said connection arrangement includes a plurality of mounting brackets (316, 318, 320, 322), wherein the plurality of mounting brackets (316, 318, 320, 322) are mounted to the two adjacent support arms (246A, 246B) and to the center endless belt conveyor (118).

3. The draper platform of claim 2, wherein each of the plurality of mounting brackets (316, 318, 320, 322) further comprise a first coupler (400, 412) fixed to one of the two adjacent support arms (246A, 246B) and a second coupler (400, 412) fixed to a side plate (304, 306) of one side of the center endless belt conveyor (118).

4. The draper platform of claim 3, wherein each of the plurality of mounting brackets further comprise an elastomeric bushing (408), disposed between the first coupler (400, 412) and the second coupler (400, 412).

5. The draper platform of claim 1, further comprising first and second drive motors, wherein said first and second drive motors are supported on a first (246A) of said two adjacent support arms (246A, 246B) and a second (246B) of said two adjacent support arms (246A, 246B), respectively, wherein said center endless belt conveyor (118) is supported on drive shafts extending from said first and second drive motors.

6. The draper platform of claim 5, wherein the center endless belt conveyor (118) further comprises a drive roller disposed to drive the center endless belt conveyor (118), and further wherein the drive roller is supported on and driven by the drive shafts of the two drive motors (308, 310).

7. The draper platform of claim 1, wherein the center endless belt conveyor (118) comprises first and second side plates (304, 306) that support a front roller (300) and a rear roller (302) in spaced-apart relation, and an endless conveyor belt supported for rotation about the front roller (300) and the rear roller (302), and further wherein the center endless belt conveyor (118) is supported on elastomeric bushings forming part of said connection arrangement which connects the first and second side plates (304, 306) to inner facing surfaces (312, 314) of the two adjacent support arms (246A, 246B).

* * * * *